(12) United States Patent
Schedivy

(10) Patent No.: US 7,564,479 B2
(45) Date of Patent: Jul. 21, 2009

(54) REARVIEW CAMERA DISPLAY MOUNTED ON A VEHICLE OVERHEAD CONSOLE

(75) Inventor: George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 380 days.

(21) Appl. No.: 11/100,179

(22) Filed: Apr. 6, 2005

(65) Prior Publication Data

US 2006/0227212 A1 Oct. 12, 2006

(51) Int. Cl.
*H04N 7/18* (2006.01)

(52) U.S. Cl. ............... 348/148; 348/113; 348/115; 348/837

(58) Field of Classification Search ......... 348/142–160, 348/113–120, 837
See application file for complete search history.

(56) References Cited

U.S. PATENT DOCUMENTS

| | | | |
|---|---|---|---|
| 4,214,266 A | 7/1980 | Myers | 358/108 |
| 4,910,591 A | 3/1990 | Petrossian et al. | 358/103 |
| 5,016,996 A | 5/1991 | Ueno | 350/600 |
| 5,027,200 A | 6/1991 | Petrissuab et al. | 358/103 |
| 5,253,115 A | 10/1993 | Ueno | 359/838 |
| 5,285,060 A | 2/1994 | Larson et al. | 250/214 |
| 5,289,321 A | 2/1994 | Secor | 359/896 |
| 5,416,313 A | 5/1995 | Larson et al. | 250/214 |
| 5,530,240 A | 6/1996 | Larson et al. | 250/214 |
| 5,574,443 A | 11/1996 | Hsieh | 340/901 |
| 5,631,638 A | 5/1997 | Kaspar et al. | 340/902 |
| 5,670,935 A | 9/1997 | Schofield et al. | 340/461 |
| 5,786,772 A | 7/1998 | Schofield et al. | 340/903 |
| 5,949,331 A | 9/1999 | Schofield et al. | 340/461 |
| 5,956,181 A | 9/1999 | Lin | 359/630 |
| 6,222,447 B1 | 4/2001 | Schofield et al. | 340/461 |
| 6,304,173 B2 * | 10/2001 | Pala et al. | 340/461 |
| 6,795,237 B1 * | 9/2004 | Marinelli et al. | 359/353 |
| 7,036,936 B2 * | 5/2006 | Hattori et al. | 353/13 |
| 2004/0036769 A1 | 2/2004 | Sadahiro | 348/148 |

* cited by examiner

*Primary Examiner*—Andy S Rao
(74) *Attorney, Agent, or Firm*—F. Chau & Associates, LLC.

(57) ABSTRACT

A video display system for a vehicle includes a first video display for providing an image projection to a rearview mirror of the vehicle, and a second video display mounted behind the first video display. A camera can provide an image feed to the first video display, and the second video display can display media content such as DVD media.

28 Claims, 4 Drawing Sheets

REARVIEW CAMERA DISPLAY MOUNTED ON A VEHICLE OVERHEAD CONSOLE

TECHNICAL FIELD

The present disclosure generally relates to vehicle rearview systems, and more particularly to a camera based overhead rearview system mounted inside an automobile.

DISCUSSION OF THE RELATED ART

Newer designs of vehicles, for example, automobiles, increasingly include electronic technologies such as entertainment systems, navigational systems, telematics, etc. While such technologies enhance the automobile user's driving experience, they also present automobile design challenges. Some of the devices used inside an automobile are known to be relatively small, easily mountable inside a volume of an automobile's interior, are non-obstructive so as not to distract the driver.

In recent times DVD (Digital Video Disk) entertainment systems installed inside an automobile for viewers seated behind the front row of seats have become quite popular. Video screens for such a DVD player are known to be mounted in an overhead center position behind the driver seat row so as to be viewable by the riders in the backseat(s). However, with increasing popularity, the users of such in-vehicle DVD entertainment systems want ever larger video screens.

Large screen DVD players can pose obstacles in the line-of-sight for the rearview mirror which is a critical driving-aid for a driver. While a DVD player video screen in some cases can be folded upward, riders in the backseat can flip open a folded video screen at any time which may create a sudden driving safety hazard for the driver. This may lead to dangerous accidents if the driver is unable to see a clear rear view because the video screen is obstructing the driver's line-of-sight. Also, blind spots, not necessarily caused by a large screen DVD player in a vehicle restrict a driver's view at some angles. Hence, to ensure driver safety and provide comfortable entertainment to backseat riders there is a need for a device and/or a system that provides the driver with a correct and clear view in the rearview mirror even when a DVD player video screen is in the line-of-sight of the rearview mirror.

SUMMARY OF THE INVENTION

A video display system for a vehicle includes a first video display for providing an image projection to a rearview mirror of the vehicle, and a second video display mounted behind the first video display. A rearview camera can provide an image feed to the first video display. The second video display can display media content such as DVD video. The first video screen and the rearview mirror can be synchronized to move in tandem when the position of either the first video screen or the rearview mirror is changed to maintain the projection of the image displayed on the first video screen onto the rearview mirror. Further, an image processing system can be used to enhance or correct an image displayed on the first video screen.

BRIEF DESCRIPTION OF DRAWINGS

Preferred embodiments of the present invention can be understood in more detail from the following descriptions taken in conjunction with the accompanying drawings, of which.

DETAILED DESCRIPTION OF THE EXEMPLARY EMBODIMENTS

Preferred embodiments of the present invention will now be described more fully hereinafter below in more detail with reference to the accompanying drawings, in which preferred embodiments of the invention are shown.

Figure 1:
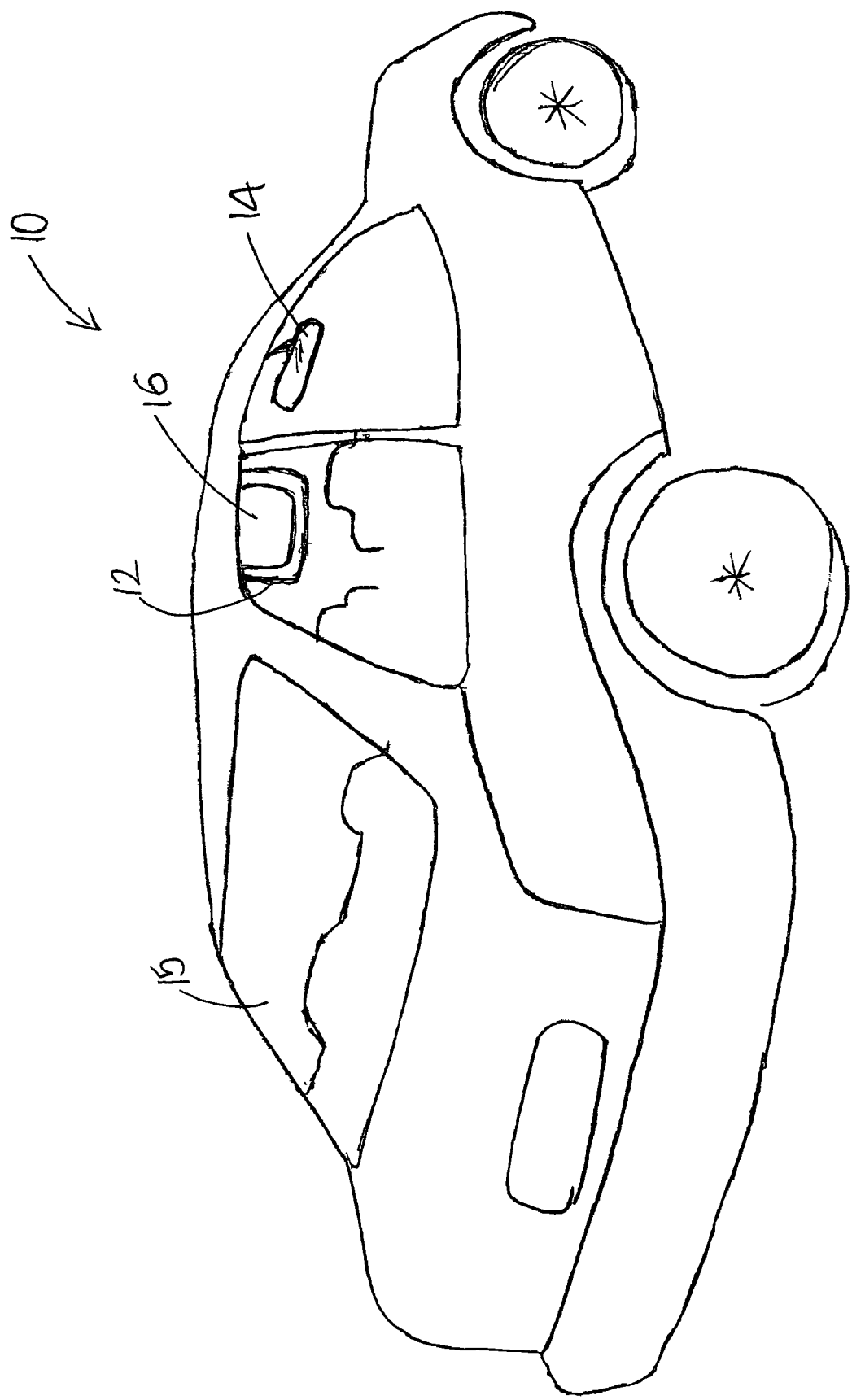
FIG. 1 shows a video screen positioned inside a vehicle in an embodiment of the present invention.

FIG. 1 shows a video screen positioned inside an automobile in an embodiment of the present invention. An automobile 10 is shown in an outline form. A video unit 12 including a video screen 16 is shown as positioned behind the driver seat row and in an overhead mounting position. The rearview mirror 14 enables the driver to view a scene on the rear side of the car by providing a reflection of the image on the rear side of the car. The image in the rearview mirror 14 is received as an optical view from a rear windshield 15 over an optical line-of-sight.

The video unit 12 can be mounted in a center overhead position to enable all passengers on the backseat to have a proper view of the display content of the video screen 16. If the video screen 16 is of a relatively small size then it may not be an obstruction in the optical path of the rearview mirror 14. However, in some instances, due to a larger size of the screen, the video unit 12 may be in the optical path or line-of-sight of a rearview mirror 14. Users may prefer a relatively larger video screen 16 for enhanced viewing of entertainment like movies or video games. Also, larger video screen 16 may be preferred in large vehicles (e.g., minivans, minibuses, large sport-utility vehicles, etc.) having multiple backseat rows of seating. A large screen may block the rearview for the driver in part or in full.

Figure 2:
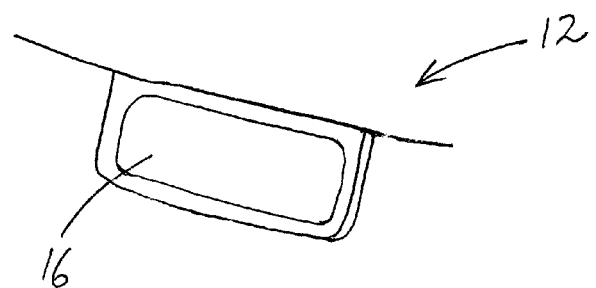
FIG. 2 shows a view of a video unit having a video screen according to an embodiment of the present invention.

FIG. 2 shows a view of a video unit 12 having a video screen 16. The video unit 12 includes a video screen 16 that displays media content to the passengers in seating rows behind the driver. The media content that can be displayed on the video screen 16 can be sourced from any type of media device. For example, the media content can be sourced from a DVD (Digital Video Disk) player, a video cassette/tape player, a flash-memory media player, a magnetic storage based media player, a hard drive based media player, a video game player, a navigation system or a satellite television signal.

Figure 3:
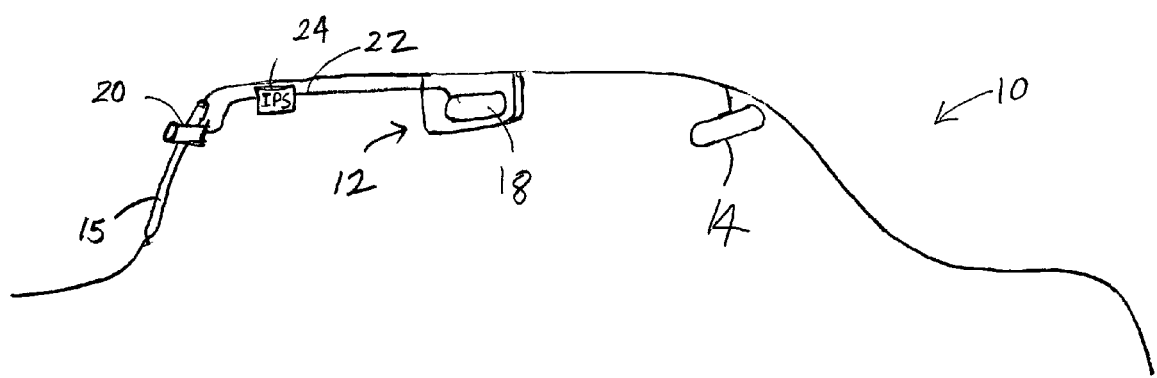
FIG. 3 shows a rearview imaging system according to an embodiment of the present invention.
Figure 4:
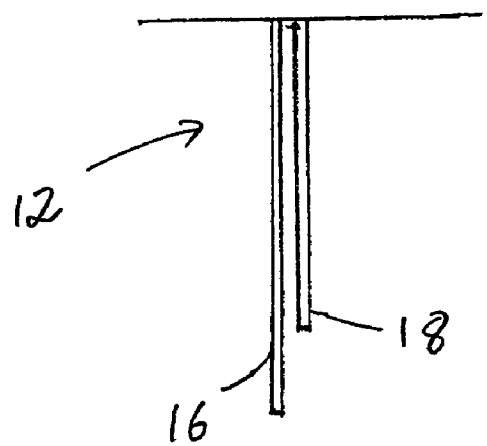
FIG. 4 shows a side view of a video unit having separate screens according to an embodiment of the present invention.
Figure 5:
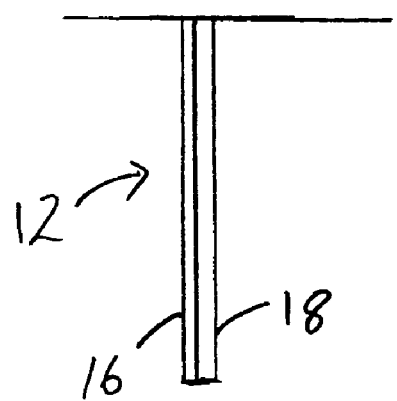
FIG. 5 shows a side view of a video unit having joined screens.

Referring to FIGS. 3-5, the video unit 12 is provided with a rearview screen 18 on the opposite side of the display side of the media screen 16.

FIG. 3 shows a rearview imaging system according to an embodiment of the present invention. On the backside of the video screen 16, the video unit 12 has a rearview screen 18, which shows a rear view image that is projected onto the rearview mirror 14. The rearview screen 18 can be of any size that can be used to project the image in the rearview screen 18 on to the rearview mirror 14 over an optical path.

The rearview screen 18 can source an image from the rear side of the automobile 10 through any automobile rearview imaging system. For example, is in at least one embodiment a rearview camera 20 is used to capture a view of the rear of a vehicle. The rearview camera 20 can be any image capture device that is mounted to capture the rear side of the vehicle. For example, the camera 20 can capture views behind the vehicle that the driver can use when driving the vehicle. Such views include for example, scenes that may be obstructed by a large screen, blind spots and objects or persons behind the vehicle that may not be readily seen when backing up the vehicle. The rearview camera 20 can be a CCD (Charged Couple Device) based camera, a CMOS (Complementary Metal Oxide Semiconductor) based camera, etc. The rearview camera 20 can be connected to the rearview screen 18. Accordingly, the image captured by the camera 20 is displayed on the rearview screen 18 and optically projected onto the rearview mirror 14. In one embodiment, the rearview camera 20 can provide night vision capability. For example, the night vision capability can provided through thermal, infrared imaging devices.

An image link 22 can be used to provide a connection between the rearview camera 20 and the rearview screen 18. In different embodiments of the invention, the image link 22 can be a wired connection, or a wireless connection using Radio Frequencies (RF), Infrared (IR), microwave or any other wireless transmission technique. In one embodiment where the image link 22 is a wired connection, the image link 22 can be part of the vehicle wire harness system and can be installed on or above vehicle headliner.

The image link 22 can be routed through an image processing system 24 that can be used to perform image processing function(s) on the image captured by the rearview camera 20. For example, the image processing functions can include enhancing the sharpness, clarity, brightness, contrast and other image parameters of the video signal from the rearview camera 20. The image processing system 24 can also be used to additionally add visual symbols or information obtained from other sensors or devices. For example, temperature outside or inside the vehicle, wind speed, GPS (Global Positioning System) parameters, weather related or other warnings, vehicle dashboard information, for example, seat-belt indicator, safety warning signs, speeding warnings, etc., can be superimposed or combined with the rear view scene captured by the rearview camera 20 and projected on to the rearview mirror 14.

The image processing system 24 can be configured as an optical system, electro-optical system, digital system or an analog system. Further, the image processing system 24 can provide corrections for lateral optical inversion of image captured from the camera and shown in the mirror.

FIG. 4 shows a side view of a video unit 12 having separate video and rearview screens 16 and 18. In one embodiment the video unit 12 includes a video screen 16 that is physically separate and positioned on the back side of the rearview screen 18. The video screen 16 is preferably aligned with the backside of the rearview screen 18. This type of video unit 12 provides ease of maintenance because both the screens are separate and hence can be separately removed for repair. The cost of replacement for a damaged video unit 12 can also be reduced because if one of the screens is damaged then only the damaged screen has to be removed and replaced. Those skilled in the art will appreciate that though the rear view screen 18 is shown as having shorter different dimensions (length) than the video screen 16 both screens 16 and 18 can have dimensions in different embodiments of the invention.

The video screen 16 and the rearview screen 18 can be constructed using any of the one or more display technologies. Examples of display technologies that can be used are: a liquid crystal display device, an electro-luminescent display device, a cathode-ray tube device and a gas plasma device, etc.

The video screen 16 and the rearview screen 18 may be stowed away by folding to align parallel with the vehicle roof. Hence, a driver of the vehicle has an option to use optical rearview mirror without the aid of the camera if so desired.

FIG. 5 shows a side view of a video unit 12 having joined screens. In at least one embodiment, the video unit 12 can be an integrated unit having a video screen 16 joined back-to-back with a rear view screen 18. In such embodiment with joined screens 16 and 18, the cost of manufacturing and mounting the video unit 12 can be reduced. For example, the manufacturing cost can be reduced by having an integrated plastic molding for the video unit 12 that can receive both the screens 16 and 18. Also, the size of an integrated unit can be reduced.

A driver of a vehicle having relatively large video screens that block the rear view would have to rely on side mirrors and guess work to perceive the objects or conditions on the rear side of the vehicle. This can lead to dangerous accidents. Further, even if a display screen does not block the rear view, a driver is still vulnerable to blind spots or the inability to see small objects or gage distances of nearby objects or people behind the vehicle. The present invention in its various embodiments can prevent accidents by providing a driver with a complete view of objects and conditions behind the vehicle and particularly those objects that are in a close range.

Figure 6:
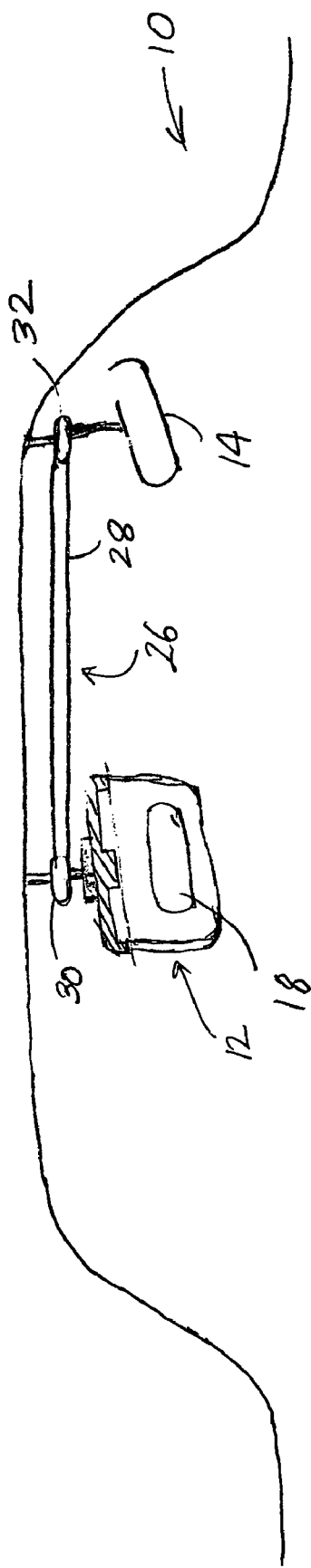
FIG. 6 shows a mechanical link according to an embodiment of the invention.

FIG. 6 shows a mechanical link in an embodiment of the invention. In one embodiment, the video unit 12 and the rearview mirror 14 can be synchronized to move in conjunction with a change in the positions of either or both the video unit 12 and the rearview mirror 14. For example, a driver of the automobile 10 can adjust the position of the rearview mirror 14 to suit his height or seat position which necessitates a change in the position of the rearview screen 18 of the video unit 12 to maintain optical line-of-sight. Alternatively, a user in the backseat may make a change in the alignment or position of video screen 16 to adjust the viewing angle. This may require a change in the rearview screen 18 position to maintain the optical path for projecting the rear scene onto the rear view mirror 14.

Synchronization between the positions of the video unit 12 and the rearview mirror 14 maintains the line-of-sight between the rearview mirror 14 and the rearview screen 18. Such synchronization can be performed in multiple ways. For example, a mechanical link 26 can be provided between the rearview mirror 14 and the video unit 12 to move them simultaneously. An example of the mechanical link 26 shown includes a belt 28 that is wound around bearings 30 and 32 that are attached to the video unit 12 and the rearview mirror 14 respectively. This arrangement provides a block-and-tackle assembly with two bearings 30 and 32 being the pulleys. Any movement in the positions of video unit 14 makes the bearing 30 turn the belt 28 which in turn rotates the bearing 32 to change the position of the rearview mirror 14 to maintain the relative angular positions of the rearview screen 18 in context of the rearview mirror 14. Similarly, the position of the video unit 12 is adjusted when the position of the rearview mirror 14 is changed.

Alternatively, an electromechanical system (not shown) with stepper motors replacing the bearings 30 and 32 and sensors (e.g., transducers) to detect changes in the positions of the video unit 12 and rearview mirror 14 can be provided for accurate position synchronization between the rearview mirror 14 and the video unit 12 to move them simultaneously.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A video display system for a vehicle, the system comprising:
   a first video display mounted overhead in the vehicle and facing a rearview mirror of the vehicle, wherein the first video display displays an image captured by a camera and the displayed image is projected onto the rearview mirror; and
   a second video display mounted behind the first video display, wherein the first and second video displays form an integral unit.

2. The system of claim 1, wherein the first video display is at least one of a liquid crystal display device, an electro-luminescent display device, a cathode-ray tube device and a gas plasma device.

3. The system of claim 1, wherein the second video display is at least one of a liquid crystal display device, an electro-luminescent display device, a cathode-ray tube device and a gas plasma device.

4. The system of claim 1, wherein the second video display is coupled with a media player to display media contents on the second video display.

5. The system of claim 4, wherein the media player is at least one of a digital video disk (DVD), a video cassette player, a flash-memory media player, a magnetic storage media player and a hard-disk based media player.

6. The system of claim 1, wherein the second video display provides a display for a video game.

7. The system of claim 1, wherein the second video display provides a display for a television signal.

8. The system of claim 1, further comprising:
   a navigation system coupled to the first video display, wherein the first video display shows navigation information received from the navigation system.

9. The system of claim 1, wherein the first and second video displays are connected to a wiring harness of the vehicle.

10. The system of claim 1, wherein:
    the image captured by the camera is from the rear side of the vehicle and the camera transmits a video signal to the first video display for displaying the image on the first video display.

11. The system of claim 10, wherein the camera is coupled to the first video display through a wired link.

12. The system of claim 10, wherein the camera is coupled to the first video display through a wireless link.

13. The system of claim 10, further comprising:
    an image processing system coupled to the camera and the first video display.

14. The system of claim 13, wherein the image processing system alters at least one of sharpness, clarity, brightness, contrast and color image parameters for the video signal.

15. The system of claim 13, wherein the image processing system adds a visual symbol to the image representing at least one of temperature, wind speed, GPS (Global Positioning System) parameters, weather information, warnings, and vehicle dashboard information.

16. The system of claim 13, wherein the image processing system provides correction for lateral inversion of the image.

17. The system of claim 1, wherein:
    the image captured by the camera is of a driver's blind spot and the camera transmits a video signal to the first video display for displaying the image on the first video display.

18. A video display system for a vehicle, the system comprising:
    a first video display, facing and optically synchronized with a rearview mirror of the vehicle, wherein the first video display displays an image that is projected onto the rearview mirror; and
    a second video display, mounted behind the first video display, wherein both the first and second video displays are mounted in an overhead position inside the vehicle, and wherein the first and second video displays form an integral unit.

19. The system of claim 18, further comprising a link for optically synchronizing the first video display with the rearview mirror, wherein the link causes movement of at least one of the first video display and the rearview mirror to maintain the image projected onto the rearview mirror.

20. The system of claim 18, wherein the link is a mechanical assembly.

21. The system of claim 18, wherein the link is an electro-mechanical assembly.

22. The system of claim 18, wherein the second video display is mounted to be aligned with a backside of the first video display.

23. A video display system for a vehicle, the system comprising:
    a rearview mirror; and
    a video unit comprising a first video display facing the rearview mirror, wherein the first video display displays an image and the displayed image is projected onto the rearview mirror, and a second video display mounted behind the first video display, wherein the first and second video displays form an integral unit.

24. The system of claim 23, wherein one of the first and second video displays is at least one of a liquid crystal display device, an electro-luminescent display device, a cathode-ray tube device and a gas plasma device.

25. The system of claim 23, further comprising a link for optically synchronizing the first video display with the rearview mirror, wherein the link causes movement of at least one of the first video display and the rearview mirror to maintain the image projected into the rearview mirror.

26. The system of claim 25, wherein the link is a mechanical assembly including a belt.

27. The system of claim 25, wherein the link is an electro-mechanical assembly.

28. The system of claim 23, further comprising:
    a camera for capturing an image from the rear side of the vehicle and transmitting a video signal to the first video display for displaying the image on the first video display.

* * * * *